United States Patent

[11] 3,591,019

| [72] | Inventors | Robert L. Beninger<br>Sheboygan;<br>Grant Hill, Jr., Elkhart Lake; Lawrence C.<br>Oertle, Jr., Random Lake; Paul W.<br>Jacobsen, Kiel, all of, Wis. |
|---|---|---|
| [21] | Appl. No. | 836,869 |
| [22] | Filed | June 26, 1969 |
| [45] | Patented | July 6, 1971 |
| [73] | Assignee | H. G. Weber and Company, Inc.<br>Kiel, Wis. |

[54] STACKER FOR CASES AND THE LIKE
3 Claims, 2 Drawing Figs.

[52] U.S. Cl. ........................................... 214/6
[51] Int. Cl. ...................................... B65g 57/06
[50] Field of Search ................................ 214/6 H, 6
    D, 6 K, 6.1, 6 P; 271/88

[56] References Cited
UNITED STATES PATENTS

| 1,701,760 | 2/1929 | Paffen | 214/6 D X |
| 2,637,450 | 5/1953 | Eshelman | 214/6 K |
| 2,818,156 | 12/1957 | Edwards | 214/6 P UX |
| 2,984,838 | 5/1961 | Parker | 214/6 H X |
| 3,056,513 | 10/1962 | Von Gal, Jr. | 214/6 H |
| 3,101,851 | 8/1963 | Heide et al. | 214/6 H |
| 3,381,830 | 5/1968 | Vasse | 214/6 H |
| 3,418,895 | 12/1968 | Palmer | 214/6 H X |
| 3,456,815 | 7/1969 | Carrels | 214/6 K |

*Primary Examiner*—Gerald M. Forlenza
*Assistant Examiner*—Robert J. Spar
*Attorney*—Hill, Sherman, Meroni, Gross and Simpson

ABSTRACT: Stacker for cases having an elevated loading station and a lower delivery station and two platforms, connected to a pair of endless chains, driven in one direction. The platforms are spaced along the chains so that when one platform is at the delivery station the other platform is entering the loading station. The platforms each include two laterally spaced material carrying surfaces accommodating the platform to pass beneath the delivery station and deposit a column of cases thereon. The loading station includes an infeed conveyor, a stop gate limiting travel of a case along the infeed conveyor when another case is at the loading station, and slide rails supporting the case free from the platform as the platform has moved to its loading station, and movable to release the case onto the platform for lowering movement thereby.

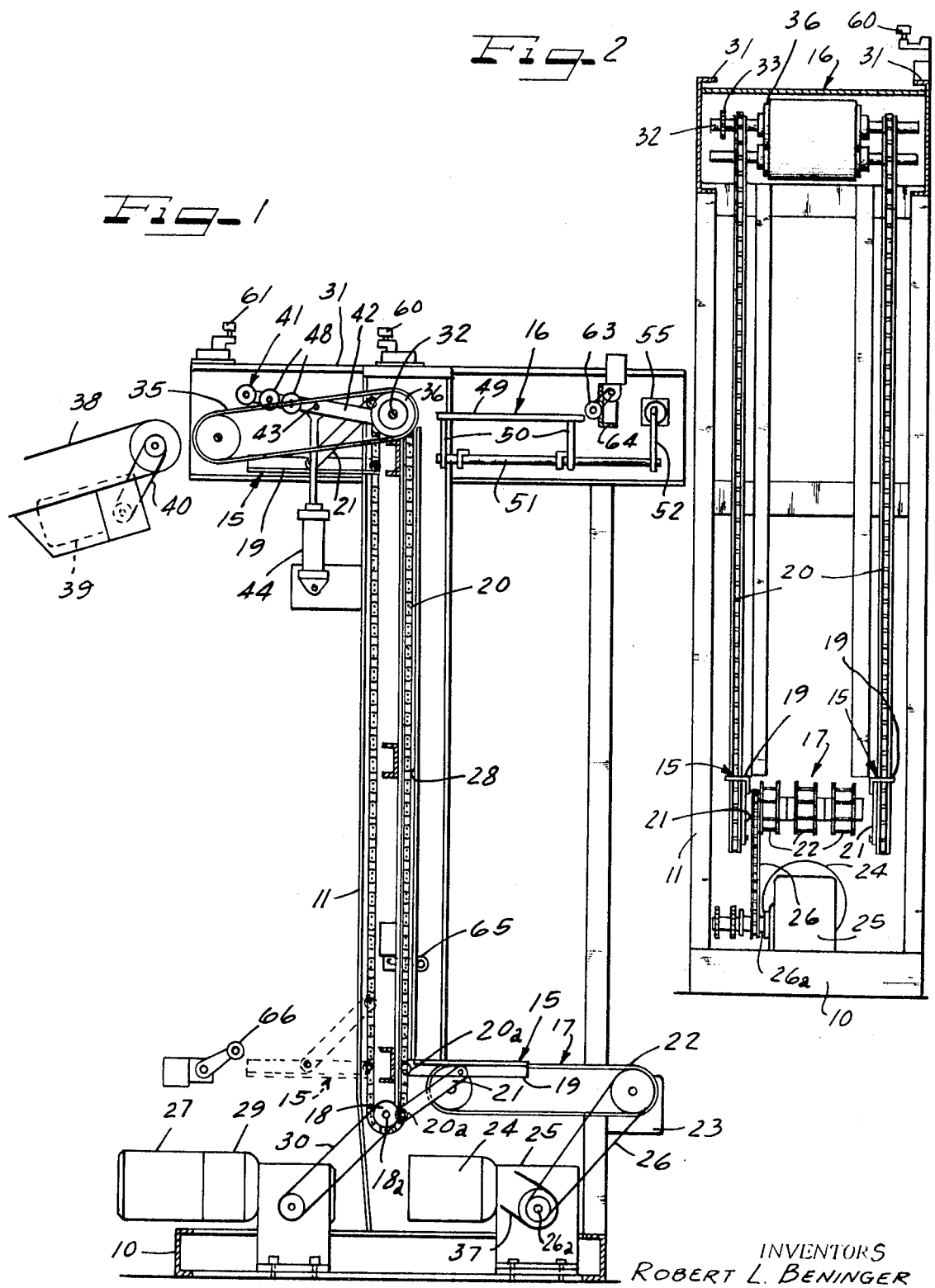

STACKER FOR CASES AND THE LIKE

OBJECT OF THE INVENTION

A principal object of the present invention is to provide an improved form of stacker for boxlike articles, such as cases, arranged with a view toward increasing the speed of stacking.

Another object of the invention is to simplify the stackers heretofore used for stacking boxlike articles, and increase the speed of stacking by providing two laterally spaced vertically extending endless chains, movable in the same direction at the same rates of speed, and by supporting platforms on the chains to move from an elevated loading station to an aligned lower delivery station, and arranged to effect the deposit of a first case on one platform and the delivery of a second case on top of the first case and the stacking of one case on top of the other as the platform moves downwardly from the loading to the delivery station.

A still further object of the invention is to provide a novel form of stacker for cases and the like, utilizing two laterally spaced endless chains extending vertically from a loading to an aligned lower delivery station carrying two platforms spaced along the chains to move one platform to the elevated loading station as the other platform moves downwardly to the aligned delivery station, and by providing a novel, simple and efficient control means for cases coming onto the stacker and for vertical movement of the platforms, to automatically effect the stacking of cases one on top of the other as one platform is loaded, while the other platform moves up in position to be loaded.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic view in side elevation, diagrammatically illustrating a form of stacker constructed in accordance with the principles of the present invention; and FIG. 2 is a diagrammatic front end view of the stacker shown in FIG. 1, with certain parts broken away and certain other parts shown in section.

DESCRIPTION OF PREFERRED EMBODIMENT OF INVENTION

In FIG. 1 of the drawings, we have diagrammatically shown a stacker operating on principles somewhat similar to the stacker shown in an application filed herewith by Robert L. Beninger, Grant Hill, Jr. and Lawrence C. Oertle, Jr., Ser. No. 836,870. The stacker of our present invention differs from that of the previous invention in that two platforms 15 are supported on vertically traveling endless chains 20, which are driven to travel in one direction so that as one platform moves beneath the delivery station and has deposited a column of cases thereon, the other platform is moving to the elevated loading station and comes into the loading station, as the column of cases is delivered from the stacker.

Like the stacker of application Ser. No. 836,870, the present stacker includes a base 10, a frame 11 extending upwardly from said base and having an elevated loading station 16 and a downwardly spaced aligned delivery station 17 spaced above the base 10 a distance sufficient to accommodate the platforms 15 to turn about drive sprockets 18 on a drive shaft 18$^a$, disposed beneath the delivery station, and to be elevated by the return runs of the endless chains 20 upwardly to the loading station 16 and turn about idlers (not shown) freely mounted on an idler shaft 32, at the elevated loading station 16.

The laterally spaced platform chains 20 are driven from a main drive motor 27 in one direction, to move one platform 15 downwardly as loaded with cases and to move the second platform upwardly to the loading station as the first platform passes beneath the delivery station.

The main drive motor 27 drives the platform chains 20 and advances the platform 15 downwardly along vertical guideways 28 in steps. The drive motor 27 is shown as having a speed reducer housing 29 forming a part of the casing for said motor and having speed reducer gearing (not shown) therein, including a clutch (not shown) and a separate brake (not shown), to effect a drive to the platform chains 20 in a single direction, and to stop travel of said chains and hold said chains from travel as the platform 15 is elevated into position to receive a case and each time the platform has moved downwardly along the guideways 28 into position to have cases stacked on top of the cases on said platform. A chain and sprocket drive 30 may be provided to drive the platform chains 20 and the platform 15 mounted thereon. While the motor 27 normally drives the platform chains 20 in the same direction, it may be reversible under the control of the operator of the stacker, to clear the stacker under certain conditions.

The platform 15 is shown in FIG. 2 as including two laterally spaced supporting surfaces each of which is pivoted to an endless chain 20 and extends outwardly therefrom in order to accommodate the platforms to move beneath the conveyors 22 and upwardly along opposite sides of a conveyor 35. For the purposes of simplicity, the two horizontally aligned supporting surfaces will be referred to as a single platform. Each supporting surface is formed by the horizontal leg of an angle iron 19, pivoted at its rear end to a link of an endless chain. A brace 21 is pivoted to the angle iron 19 intermediate its ends and extends angularly downwardly therefrom to the chain 20 and is pivotally connected thereto. Guide rollers 20$^a$ may be mounted on the endless chains 20, preferably coaxial with the pivot pins connecting said angle irons and braces to the chains 20. Said guide rollers may extend within the guideway 28, and serve to guide the chain and platform 15 to assure the platform will always be in a horizontal position during travel thereof from the elevated loading station downwardly to the delivery station 17.

The delivery station 17 includes a series of side-by-side conveyors 22, which may be chain conveyors, having horizontal material carrying surfaces and supported between the sidewalls of outboard supports 23, extending outwardly of the frame 11, along each side of the outermost of said chain conveyors, and inwardly of the angle irons 19, to accommodate the platform 15 to pass along said support and turn about the drive sprockets 18 for the endless chains 20,20. The chain conveyors 22 are suitably driven by a motor 24 and speed reducer gearing (not shown) contained in a speed reducer housing 25, having a drive shaft 26$^a$, which is shown as driving the chain conveyors 22 through a chain and sprocket drive 26.

The loading station 16 is shown as in the form of a pair of parallel spaced channels 31 suitably connected together and shown as forming the frame 11 into a generally T-shaped frame. A shaft 32 extends across said channels and is suitably journaled therein and forms a mounting for the idler sprockets (not shown) for the platform chains 20 and for a drive sprocket 33 for an infeed conveyor 35, turning about a drive roller 36 keyed or otherwise secured to the shaft 32. The shaft 32 and infeed conveyor 35 are driven from the motor 24 on the base 10 through a suitable chain and sprocket drive arrangement 37.

The infeed conveyor 35 is disposed inside of the chains 20 and platform 15 and is narrower than the cases being stacked, and is inclined upwardly from its receiving to its discharge end. Said infeed conveyor is shown in FIG. 1 as positioned in case receiving relation with respect to a transfer conveyor 38. The conveyor 38 may be driven from a motor and speed reducer 39 and chain and sprocket drive 40.

The loading station 16 also includes a gate 41 blocking the supply of cases to slide rails 49, when the platform 15 is not in position to receive a case, or when the slide rails 49 are in an open position and cases stacked on said platform would intercept a case transferred from said infeed conveyor. The gate 41 includes a pair of arms 42 pivoted for movement about the axis of the shaft 32 and extending along opposite sides of the infeed conveyor 35. The arms 42 are connected together intermediate their ends by a rod 43 extending between the runs of the infeed conveyor 35. A cylinder and piston 44 is connected with one end of the rod 43, to move the gate 41 downwardly out of intercepting relation with respect to a case deposited on the infeed conveyor 35, and upwardly with respect to the material carrying surface of said conveyor. The arms 42 have a series of rollers 48 extending inwardly therefrom toward the conveyor 35 and adapted to engage and block the passage of cases along said conveyor. The arms 42 and cylinder and piston 44 are inside of the platform chains 20 as is the cylinder and piston 44, to accommodate the platform 15 to pass upwardly along said cylinder and piston, gate and infeed conveyor about the shaft 32, to its loading station.

The horizontal slide rails 49 extend forwardly of the delivery side of the infeed conveyor 35, at a loading level, and along opposite sides of the platform 15, when at a loading level. The slide rails 49 are mounted on vertically extending parallel spaced arms 50. Each pair of arms 50 is mounted on a rock shaft 51 and extends upwardly therefrom. Said rock shafts are suitably mounted on the insides of the channels 31. Each rock shaft 51 has a lever arm 52 keyed or otherwise secured thereto and extending upwardly of said shaft. A transverse cylinder 55, suitably mounted between the channels 31 is provided to actuate the lever arms 52 and pivot the slide rails 49 outwardly about the axes of the shafts 51 to deposit a carton onto the platform 15 or onto the top of the case on said platform until a series of cases is stacked into a column of the required height. The slides 49, when moved outwardly also accommodate the platforms 15 to pass upwardly about the shaft 32 and downwardly beneath said slides into position to receive a carton discharged therefrom.

The control of lowering movement of the platform 15 and return elevating movement of a second platform 15 is by a series of limit switches 60, 61 and 63 at the loading station 16, and positioned to control the loading of a case onto the platform 15, the opening and closing of the gate 41 and the initiation of lowering movement of the platform.

A limit switch 65 is spaced downwardly along frame 11 and chains 20 and is positioned to be operated by the platform 15 upon lowering movement thereof, to effect closing of the gate 41, for example, a fourth case on top of the column is lowered beneath the slide rails 49 and said slide rails are in a case supporting position and a case is being delivered to said slide rails. This limits the height of the column.

A limit switch 66 is positioned adjacent the lower end portions of the endless platform chains 20 to be engaged and actuated by a platform 15 as it turns about its idler sprockets 18 and starts on its upward path of travel. This limit switch serves to stop the main drive and open the gate 41 to accommodate a case to be deposited on the slide rails 49 as a return platform 15 moves to its loading position, just beneath the slides 49.

The limit switches 60, 61, 63, 65 and 66 may be conventional forms of limit switches closed by the successive cases as they pass onto the loading station and by the successive platforms during the loading and return movement thereof. Said limit switches are connected in a suitable electrical control circuit (not shown) controlling the operation of the stacker through a series of relays (not shown) in a conventional manner and including time delay relays where required. The electrical control circuit may be of any well-known form and is no part of the present invention, so need not herein be shown or described further.

In operating the stacker, a pushbutton (not shown) may first be pushed. This will start the motors 27, 24 and 39 and will also effect the supply of fluid under pressure, such as air, to the cylinder 44 to open the gate 41. At least one other pushbutton (not shown) may be provided to stop the stacking operation at any time.

A first case delivered from the transfer conveyor 38 onto the infeed conveyor 35 will first engage the limit switch 61 and then engage the limit switch 60 and close said limit switches. This will effect the supply of fluid under pressure to the cylinder and piston 44 and pivot the gate 41 upwardly into a closed position, to block the supply of cartons along the infeed conveyor 35. The limit switch 61 is ineffective to complete an energizing circuit until closing of a limit switch 63 disposed forwardly of the forward ends of the slide rails 49. Said limit switch 63 is supported on a stop 64 for the cases and extending across and connecting the channels 31 together.

The first case proceeds from the limit switch 60 into engagement with the limit switch 63. This closes the gate 41 to stop the delivery of a next case to the infeed conveyor 35. The limit switch 61 is then held close by a case engaging the gate 41. A first case engaging the limit switch 63 and the limit switch 61 being held closed by a next succeeding case at the gate 41, the slide rails 49 will be released to deposit a case on the platform 15 by operation of the cylinder 55. The platform will then move downwardly under the control of the limit switch 63 until said limit switch is released by passage of the case beneath said limit switch.

As the limit switch 63 is released, the drive to the platform chains 20 will stop with the top of the case on the platform just below the slide rails. The slide rails 49 will then reposition themselves until the next case which has come onto the infeed conveyor 35 and closes limit switches 60 and 63. Closing of the limit switch 63 by the next case will again effect release of the slide rails 49 from the case and deposit the next case on top of the first case on the platform. This operation will continue until, in the present disclosure, a fourth case is loaded on top of the column. When the fourth case is on top of the column, the column will move downwardly until limit switch 63 is released. The platform 15 will then close limit switch 65. This will move the gate 41 into a closed position. At this time of the loading cycle, the fifth case is on the infeed conveyor 35 and has closed the limit switch 60. The limit switch 65 will also override the limit switch 63 so the platform and column will continue to lower beneath the delivery station 17 and chain conveyors 22 and deposit the column of five cases onto said chain conveyors.

The platform 15 will then continue around the lower drive sprockets 18 until it engages limit switch 66. At this time, an advance platform will be in a loading position. This will stop the main drive so the advance platform which is now at the top of the stacker will be in position to receive the first case of a next stack. The closing of the limit switch 66 will also effect opening of the gate 41 to accommodate the supply of a first case of the next stack onto the slide rails 49. The stacking sequence may then be repeated for the next stack of five cases without attention from the operator of the machine.

It should here be understood that while the present stacker is for stacking a column of five cases, that by varying the distance between the delivery and loading stations, and lengthening the platform chains 20, columns of various heights may be stacked.

We claim:

1. A stacker for stacking boxlike articles such as cases, comprising,
    an upright frame having,
    an elevated loading station on one side of said frame,
    means supplying boxlike articles to said loading station on the opposite side of said frame,
    a vertically aligned delivery station disposed beneath said loading station,
    means transferring a column of stacked boxlike articles along said delivery station,
    a pair of laterally spaced vertically extending endless platform carrying chains guided for movement in laterally aligned orbital paths extending along said frame between said means supplying boxlike articles and said loading station and having material carrying runs moving downwardly from said loading station to said delivery station and parallel return runs moving upwardly to said loading station, at least two platforms spaced along said endless chains, each platform including a pair of laterally spaced platform members having support surfaces extending in the same horizontal plane, each of which platform members is pivoted to one of said chains, a control link pivoted to the underside of each platform member outwardly of the respective chain and having pivotal connection with the chain in downwardly spaced relation with respect to the platform member as the platform members are moving on their material carrying runs and supporting said platform members to extend horizontally from said chains during downward travel of said chains, a motor, means driven by said motor for driving said endless chains in orbital paths in one direction and in steps, distances equal to the height of each boxlike article stacked, a pair of laterally spaced slides at said loading station laterally separable to release a boxlike article onto said platform members, an infeed conveyor supported on said frame at the top thereof at the opposite side of said endless chains from said material carrying runs and narrower than the boxlike articles stacked, and within the limits of said endless chains for supplying boxlike articles to said slides, stop gate means extending along opposite sides of said infeed conveyor within the inner margins of said platform members and effective to hold the delivery of boxlike articles to said loading station in accordance with the level of said platform members and the top of the uppermost boxlike article thereon, said endless chains and platform members being so spaced as to pass along the opposite outsides of said infeed conveyor and stop gates, and said slides and said delivery station to accommodate continuous up and down movement of said platform members into the loading and delivery positions thereof in a single direction of travel of said chains.

2. The stacker of claim 1, wherein control means is provided for said motor and includes a limit switch actuated by one platform at the bottom of its return travel and operable to stop an advance platform at said loading station and other limit switches operable by the supply of boxlike articles to said loading station to effect intermittent operation of said chains in accordance with the height of boxlike articles deposited thereon.

3. The stacker of claim 2, wherein the support rails in article receiving relation with respect to the infeed conveyor are mounted for outward swinging movement relative to the article deposited thereon to release the article onto an advance platform, and wherein a control means is provided for said rails to effect release of said rails to deposit an article on a platform therebeneath as the article is moved onto said rails to the ends thereof.